United States Patent Office 3,751,513
Patented Aug. 7, 1973

3,751,513
SKELETAL REARRANGEMENT OF OLEFINS
James J. Tazuma, Stow, Ohio, assignor to The Goodyear
Tire & Rubber Company, Akron, Ohio
No Drawing. Filed Dec. 28, 1970, Ser. No. 102,176
Int. Cl. C07c 5/22
U.S. Cl. 260—683.2
6 Claims

ABSTRACT OF THE DISCLOSURE

There is disclosed a method of skeletal rearrangement of olefins which comprises subjecting at least one olefin having at least four carbon atoms in its main chain to temperatures ranging from about 250° C. to about 650° C., while said olefin is in the presence of a catalyst from the group consisting of cupric fluoride, cupric chloride, cupric bromide and cuprous chloride, said catalyst being supported on alumina or silica alumina in an amount of about 5 to about 25 percent by weight of support.

---

This invention is directed to the skeletal rearrangement of olefins having at least four carbon atoms, for instance, the preparation of methyl butenes from 2-pentene.

Skeletal rearrangement of olefins has been conducted over a number of heterogenous acidic catalyst systems, such as silica, alumina, aluminum fluoride, phosphoric acid on kieselghur, nickel oxide on silica alumina, tungsten oxide on aluminum fluoride, chromium on aluminum fluoride and platinum on aluminum fluoride.

It has now been discovered that another class of catalysts can be employed for the skeletal rearrangement of olefins.

According to the invention, olefins containing at least four carbon atoms in the main chain undergo carbon skeletal rearrangement when said olefins are subjected to a catalyst comprising a copper salt on alumina or a copper salt on silica alumina.

These copper salts on alumina or silica alumina catalysts may be used as a fixed bed or a fluid bed. The particular copper salts which have been found useful when deposited on alumina or silica alumina for these carbon skeletal rearrangements are cupric fluoride, cupric chloride, cupric bromide and cuprous chloride.

The process operating conditions which have been found useful in this process include temperature, pressure and the rate at which the olefin is passed over the catalyst system.

The temperature employed in the process of this invention may vary widely from about 250° C. to about 650° C. with a more preferred range of about 400° C. to about 500° C.

The pressure that is usually employed is atmospheric but sub-atmospheric and super-atmospheric, up to about 100 pounds per square inch gauge, may also be employed.

The rate at which the olefins are passed over the catalyst bed in a continuous isomerization process is usually measured in terms of liquid hour space velocity (LHSV). This term "LHSV" is defined as the volume of feedstock as a liquid per volume of total catalyst plus support passed over or contacting the catalyst per hour. In practice, the LHSV may be as low as about 1 to a high of about 20 or more. However, it has been observed that good results are obtained from about 2 to about 10.

While it is not necessary to employ a diluent, it is sometimes useful to employ a diluent as a heat transfer medium. If a diluent is desired, saturated hydrocarbons, such as butane, pentane, ethane, propane and the like may be employed. Also, inert materials such as nitrogen and the inert gases may also be employed. If a diluent is employed, it is usually employed from about one volume of diluent to about one volume of olefin, up to about 5/1.

The dimensions of the fixed bed catalyst system of this invention have not been found to be critical. However, it should be realized that the ratio of the bed length to the bed diameter should be sufficient to prevent channelling of the feedstock and permit proper contact of the feedstock with the catalyst. A ratio of about 0.2/1 length to diameter has been a practical minimum. There is no theoretical maximum. However, a practical maximum would probably be about 30/1 due to excessive pressure build-up across the catalyst bed.

The catalyst of this invention which are copper halides supported on either alumina or silica-alumina require no special description, however, it has been found that the copper halides should be employed at about 5 to about 25 percent by weight of the support.

The invention is further illustrated by reference to the following examples which are designed to be illustrative and not limitative of the scope of the invention.

PREPARATION OF THE CATALYST

In a normal procedure alumina or silica alumina having a fairly high surface was impregnated with the particular copper salt at the desired weight level. This was accomplished by varying the concentration of the copper salt solution. The alumina or silica-alumina is impregnated with the particular salt in the concentration desired and then the impregnated alumina or silica alumina was dried for two hours at 120° C. In the case of $CuF_2$ it was necessary to dissolve the $CuF_2$ in a HF-water solution. Also, when $Cu_2Cl_2$ was used, it was necessary to dissolve this compound in HCl solution.

Example I

In this example 2-pentene was isomerized over a catalyst comprising 10 percent by weight of $CuCl_2$ on alumina prepared in the manner described above. The reaction conditions were 500° C. at an LHSV of 2 and the pressure was atmospheric. The reaction was continuous and was conducted in a stainless-steel reactor at about 10 cubic centimeters catalyst volume. The temperature control was provided by placing the reactor in a fluid bed heat exchange furnace. The 2-pentene was forced over the catalyst by means of a pump. The reactor was equipped with the necessary pre-heaters, temperature indicating device and the like. The isomerizate was collected and cooled in sample containers and subsequently analyzed by conventional gas chromatographic analysis techniques, and there was obtained a conversion of 35 percent of the 2-pentene converted to 2-methyl-1-butene and the selectivity to 2-methyl-1-butene and 2-methyl-2-butene was 66 percent.

Example II

This experiment was identical to Example I except that 19 percent $CuCl_2$ on alumina was employed as the catalyst. There was obtained a 40 percent conversion of the 2-pentene with an efficiency to methyl butenes of 77 percent.

Example III

This example was identical to Example I except that 10 percent by weight of $CuF_2$ on alumina was employed and the temperature was 420° C. There was obtained a 36 percent conversion of the 2-pentene with a 77 percent selectivity to methyl butenes.

Example IV

This example was identical to Example I except that the catalyst employed was 7 percent $CuCl_2$ on a silica alumina support and the temperature was 460° C. and the LHSV was 3. There was obtained a 57 percent conversion of the 2-pentene and a selectivity to methyl butenes of 75 percent.

Example V

This example was identical to Example I except that 19 percent $CuBr_2$ on alumina was employed and the temperature was 450° C. There was obtained a 14 percent conversion of 2-pentene with a 70 percent selectivity to methyl butenes.

Example VI

This example was identical to Example I except that $Cu_2Cl$ in a concentration of 14 percent supported on alumina was employed and the temperature was 475° C. There was obtained a 14 percent conversion of 2-pentene with a 75 percent selectivity to methyl butenes.

Among the olefins which may undergo a carbon skeletal rearrangement in addition to 2-pentene which forms methyl butenes upon carbon skeletal rearrangement, are 1- and 2-butene which forms isobutene; 1- and 2-hexenes which will form isoamylene; 1-pentene which forms isopentene and other straight chain olefins containing up to about 10 carbon atoms can be isomerized in accordance with this invention.

While certain representative embodiments and details have been shown for the purpose of illustrating the invention, it will be apparent to those skilled in this art that various changes and modifications may be made therein without departing from the spirit or scope of the invention.

What is claimed is:

1. A method of skeletal rearrangement of olefins which comprises subjecting at least one olefin selected from the group consisting of 1-butene, 2-butene, 1-pentene, 2-pentene, 1-hexane and 2-hexene to temperatures ranging from about 250° C. to about 650° C. at liquid hour space velocities from about 1 to about 20 while said olefin is in contact with a catalyst consisting essentially of a metal halide selected from the group consisting of cupric fluoride, cupric chloride, cupric bromide and cuprous chloride, said metal halide being supported on alumina or silica-alumina in an amount of about 5 to about 25 percent of the weight of the support.

2. A method according to claim 1 in which the olefin is 2-pentene.
3. A method according to claim 1 in which the catalyst is cupric chloride.
4. A method according to claim 1 in which the catlyst is cupric fluoride.
5. A method according to claim 1 in which the catlyst is cupric bromide.
6. A method according to claim 1 in which the catlyst is cuprous chloride.

References Cited
UNITED STATES PATENTS

| | | | |
|---|---|---|---|
| 3,584,070 | 6/1971 | Regier | 260—683.2 |
| 2,298,931 | 10/1942 | Drennan | 260—683.2 |
| 3,441,377 | 4/1969 | Sawyer et al. | 260—677 R |

DELBERT E. GANTZ, Primary Examiner

V. O'TOOLE, Assistant Examiner

PO-1050
(5/69)

UNITED STATES PATENT OFFICE
CERTIFICATE OF CORRECTION

Patent No. 3751513      Dated 8-7-73

Inventor(s) James J Tazuma

It is certified that error appears in the above-identified patent and that said Letters Patent are hereby corrected as shown below:

Column 1, line 27, "kieselghur" should read -- Kieselghur --.

Column 4, line 2, "hexane" should read -- hexene --.

Signed and sealed this 1st day of January 1974.

(SEAL)
Attest:

EDWARD M. FLETCHER, JR.       RENE D. TEGTMEYER
Attesting Officer      Acting Commissioner of Patents